United States Patent [19]

Morris

[11] Patent Number: 4,702,646

[45] Date of Patent: Oct. 27, 1987

[54] PIPE INITIATION ANCHOR

[75] Inventor: Gordon A. Morris, Edinburgh, Scotland

[73] Assignee: Santa Fe International Corporation, Alhambra, Calif.

[21] Appl. No.: 836,319

[22] Filed: Mar. 5, 1986

[30] Foreign Application Priority Data

Mar. 12, 1985 [GB] United Kingdom ............... 8506296

[51] Int. Cl.<sup>4</sup> .............................................. F16L 1/04
[52] U.S. Cl. ................................... 405/169; 405/158; 405/172
[58] Field of Search ................ 405/154, 158, 169–172, 405/195, 208, 224, 227; 166/338–344, 347; 403/322, 326, 330

[56] References Cited

U.S. PATENT DOCUMENTS

| 3,136,529 | 6/1964 | Dickinson et al. | 405/171 X |
| 3,173,271 | 3/1965 | Wittgenstein | 405/172 |
| 3,482,410 | 12/1969 | Roesky et al. | 405/171 X |
| 3,585,805 | 6/1971 | Vincent | 405/169 |
| 4,004,635 | 1/1977 | Marquaire et al. | 405/169 X |
| 4,310,264 | 1/1982 | Brownlee | 405/172 |
| 4,371,291 | 2/1983 | Morrill et al. | 405/169 |

FOREIGN PATENT DOCUMENTS 2057082 3/1981 United Kingdom ............... 405/169

Primary Examiner—Nancy J. Stodola
Attorney, Agent, or Firm—Harris, Kern, Wallen & Tinsley

[57] ABSTRACT

A pipe initiation anchor forming a fixed anchor point for use in laying underwater pipelines comprises a ground engaging member in the form of a ballast box or a ground pile, a socket for receiving an end portion of a pipeline, and a locking member for retaining the end portion of the pipeline within the socket. The locking member is pivotally mounted on the anchor and is biased towards a locking position by a counterbalance weight.

5 Claims, 10 Drawing Figures

PIPE INITIATION ANCHOR

BACKGROUND OF THE INVENTION

This invention relates to a pipe initiation anchor for use in restraining the end of an underwater pipeline in position during pipeline laying operations.

When initiating an underwater pipeline a fixed anchor point has to be provided on the sea bed to ensure that the end of the pipeline remains in the correct position as the pipeline is laid.

Hitherto such a fixed anchor point has been provided by the use of apparatus comprising a ballast box which rests on the sea bed. On top of the ballast box there is provided a framework having retention means for the end of a pipeline. There have been problems with this basic apparatus in ensuring that the pipeline is adequately retained by the apparatus. It is also necessary to ensure that the apparatus is accurately orientated to the direction of the pipeline being laid.

BRIEF SUMMARY OF THE INVENTION

According to the present invention there is provided a pipe initiation anchor forming a fixed anchor point for use in laying underwater pipelines comprising a ground engaging member, a socket for receiving an end portion of a pipeline, and a locking member for retaining the end portion of the pipeline within the socket, the locking member being pivotally mounted on the anchor and being normally biased towards a locking position.

Preferably, the end portion of the pipeline has an initiation head forming a flange around the outer surface of the pipeline, the insertion of the initiation head of the pipeline into the socket causing the locking member to pivot away from its locked position to allow the initiation head to pass into the socket then to move back to its locking position to retain the pipeline in the socket by way of the flange on the initiation head.

Preferably also, the locking member is biased towards its locking position by way of a counterbalance weight.

The ground engaging member may be either a gravity anchor comprising a ballast box with dead weights and having base spikes or alternatively a ground pile may be used to provide a fixing point.

Preferably also, a wire arrangement is provided whereby a wire passes around a pulley arrangement on the anchor and exits from the anchor through the entrance to the socket, one end of the wire being attachable to a winch arrangement and the other end of the wire being attachable to the initiation head of the pipeline to allow the initiation head of the pipeline to be pulled into the socket.

Preferably also, the part of the anchor containing the socket member is pivotally connected to the ground engaging member.

BRIEF DESCRIPTION OF THE SEVERAL VIEWS OF THE DRAWINGS

Embodiments of the present invention will now be described, by way of example, with reference to the accompanying drawings, in which.

DETAILED DESCRIPTION OF THE PREFERRED EMBODIMENTS

Figure 1:
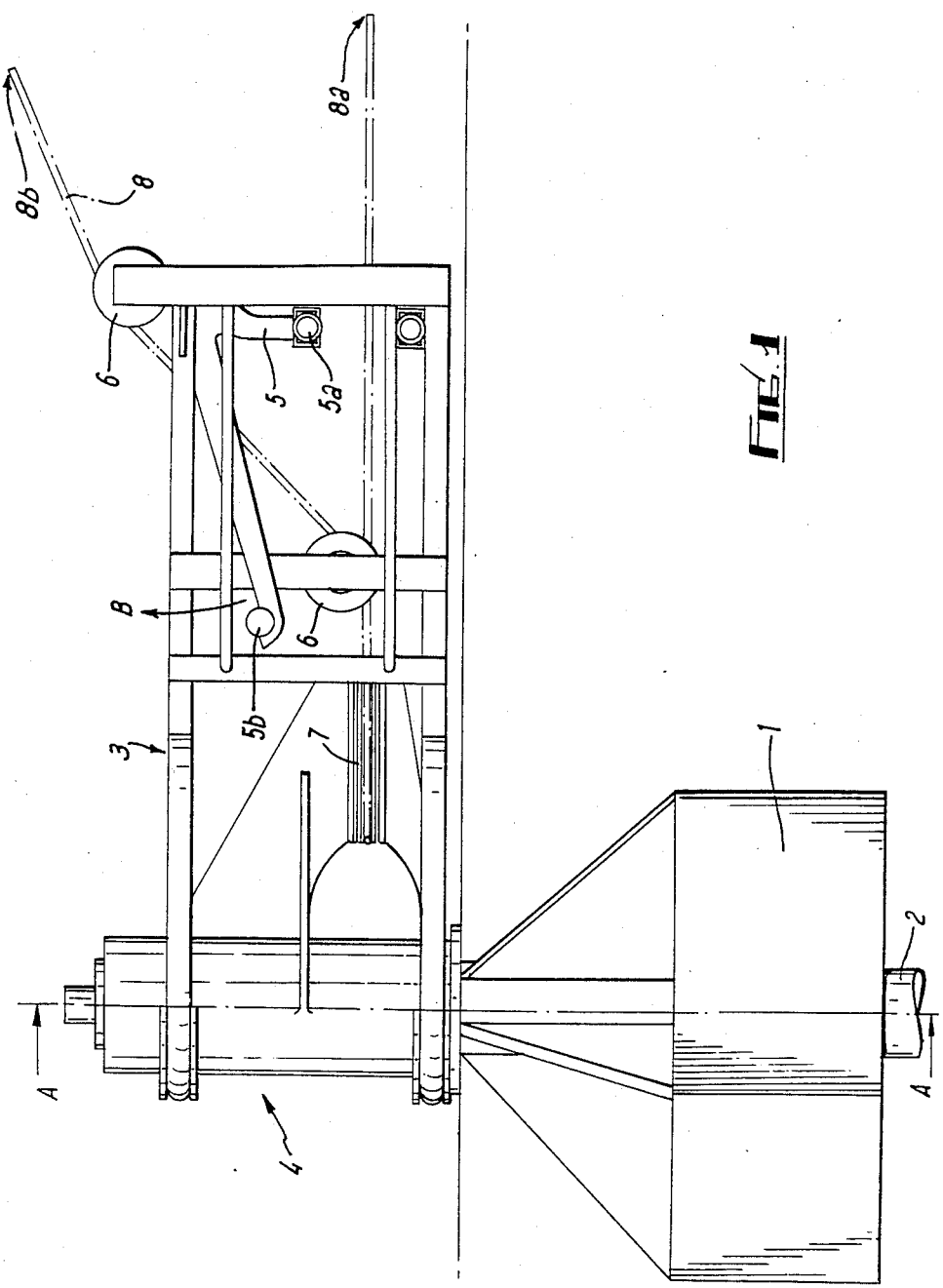
FIG. 1 is a side view of a first embodiment of a pipeline initiation anchor in accordance with the present invention.
Figure 2:
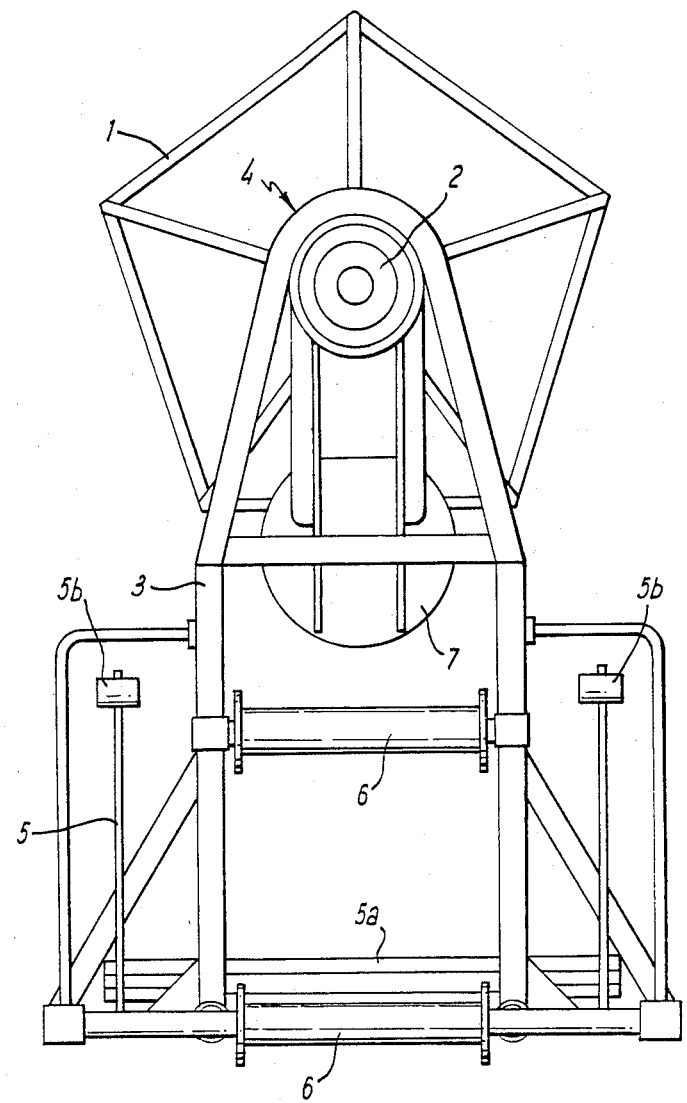
FIG. 2 is a plan view of the anchor of FIG. 1.
Figure 3:
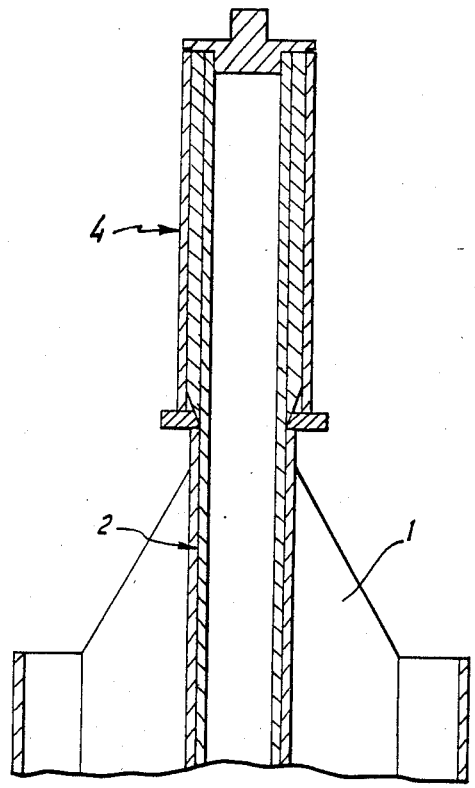
FIG. 3 is a sectional end view of the anchor of FIG. 1 taken along the line A—A.

Referring to FIGS. 1 to 3 of the drawings, a pipe initiation anchor comprises a base member 1 which is, in use, fixed in position in the seabed and secured by an anchor pile 2. A main frame assembly 3 is pivotally attached to the base member 1 by way of a swivel joint assembly 4. The main frame assembly 3 has a locking gate 5 pivotally mounted on it and also includes guide rollers 6 and cable sheave 7 for a pipeline guide wire 8.

The locking gate 5 has a locking bar 5a and counterbalance weights 5b.

In use the anchor is fixed in position on the seabed with the guide wire 8, which has been fitted around the sheave 7 over the guide rollers 6 and through the locking gate 5, buoyed off on the surface of the water. A pipeline laying vessel can retrieve the cable ready fitted to the anchor without the use of divers.

Figure 10:
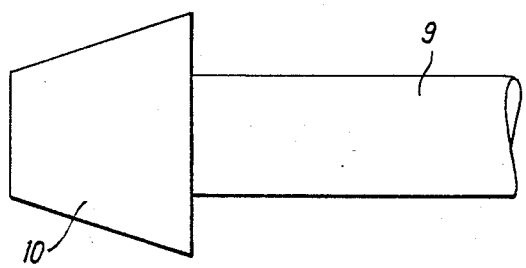
FIG. 10 is a side view of the end portion of a pipe adapted for fitment to a pipe initiation anchor.

The end of a pipeline 9 to be laid has an initiation head 10 attached (FIG. 10).

In use one end, 8a, of the guide wire 8 is attached to the pipe initiation cable (not shown) which is connected to the initiation head 10 of the pipeline 9. The other end, 8b, of the guide wire 8 is attached to a winch on the pipeline laying vessel.

The pipeline 9 is lowered from the pipeline laying vessel and the guide wire 8 is winched in so that the initiation head 10 of the pipeline 9 is pulled towards the anchor. As the initiation head contacts the locking bar 5a on the locking gate 5 it causes the locking gate 5 to pivot on its mountings in the direction of arrow B (FIG. 1). When the initiation head 10 has passed through the locking gate 5 the counterbalance weights 5b cause the locking gate 5 to close automatically so that the initiation head is locked in position by the locking bar 5a. Once the initiation head 10 is in position the pipe initiation is complete and the pipeline laying operations can then commence with the end of the pipeline being firmly fixed in position on the seabed.

The swivel joint assembly 4 allows the main frame assembly 3 and locking gate 5 to swivel freely in a horizontal plane. This has the advantages that the anchor does not have to be carefully set at the correct angle during placement and also means that various pipeline laying trajectories, through the common pivot point, can be accommodated using a single anchor.

As an alternative to the anchor being fixed to the seabed by a pile a gravity type anchor may be used.

Figure 4:
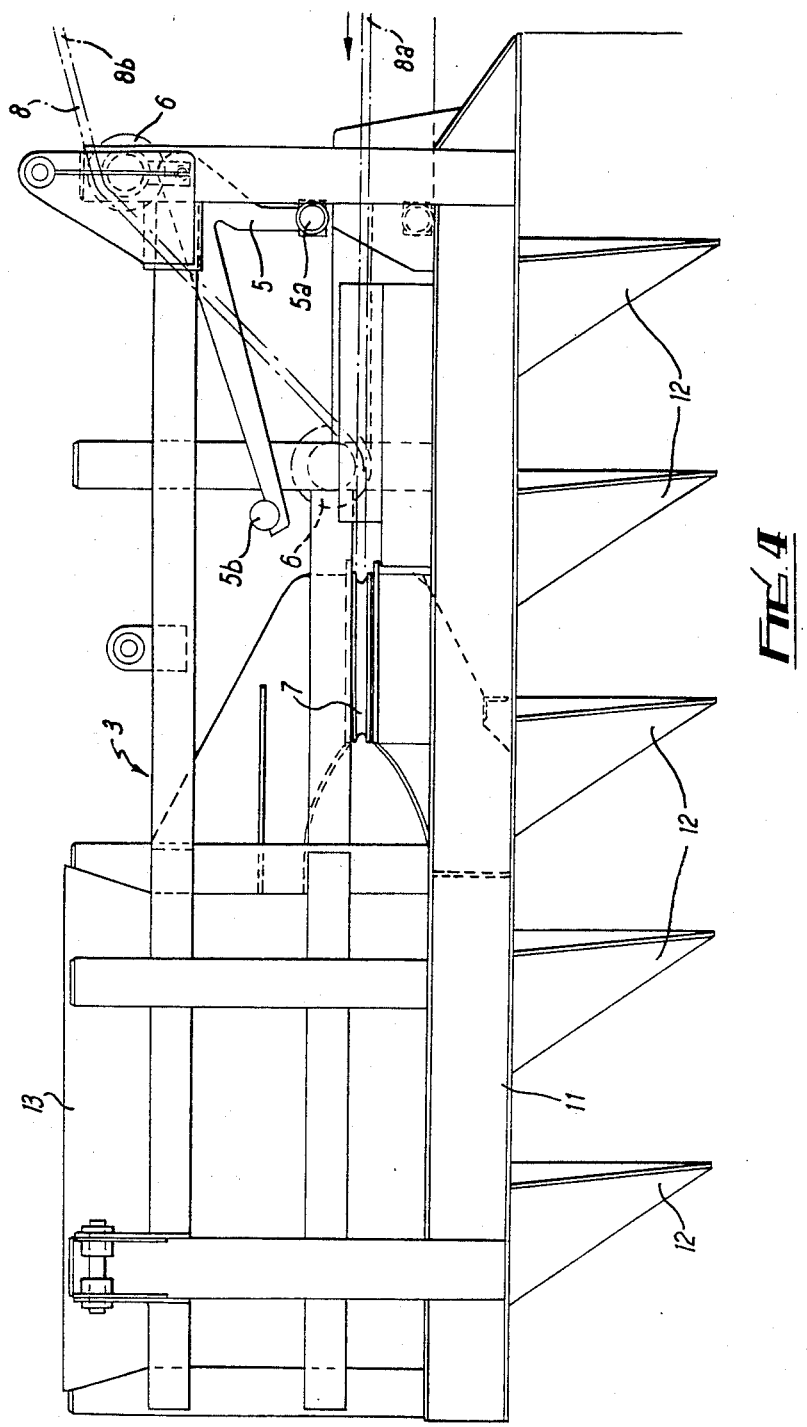
FIG. 4 is a side view of a second embodiment of a pipe initiation anchor in accordance with the present invention.
Figure 5:
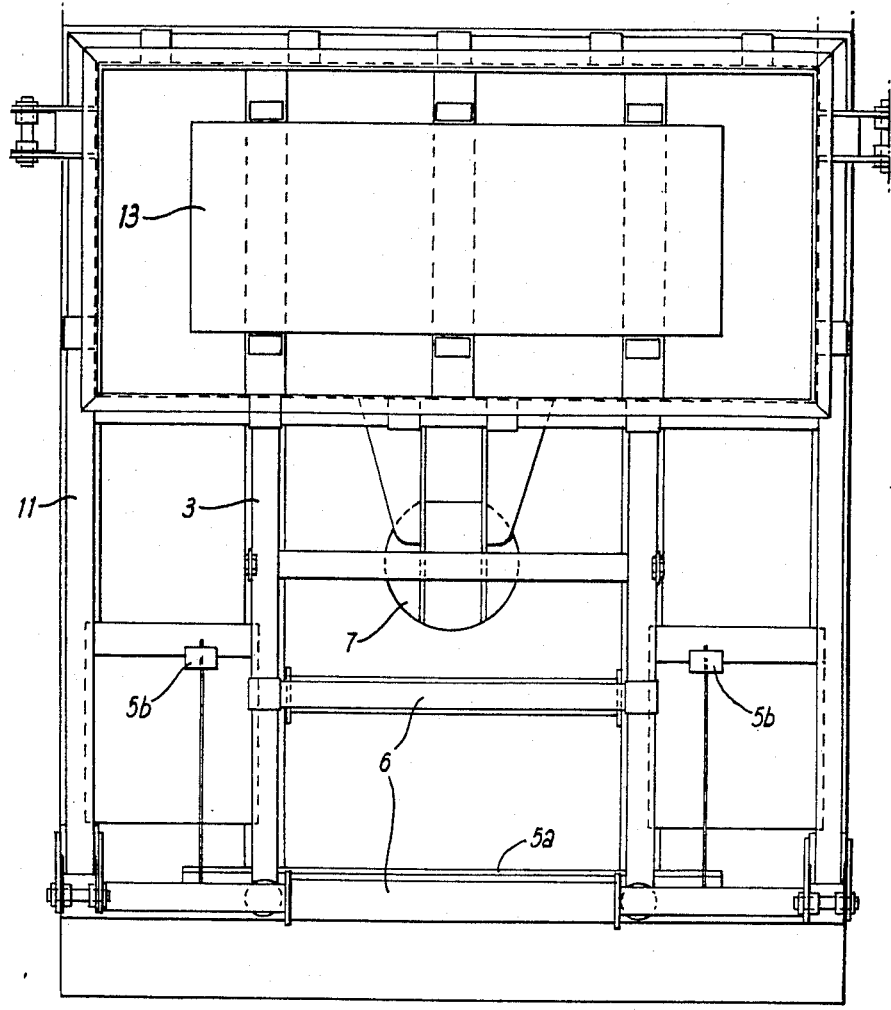
FIG. 5 is a plan view, to a smaller scale, of the anchor of FIG. 4.
Figure 6:
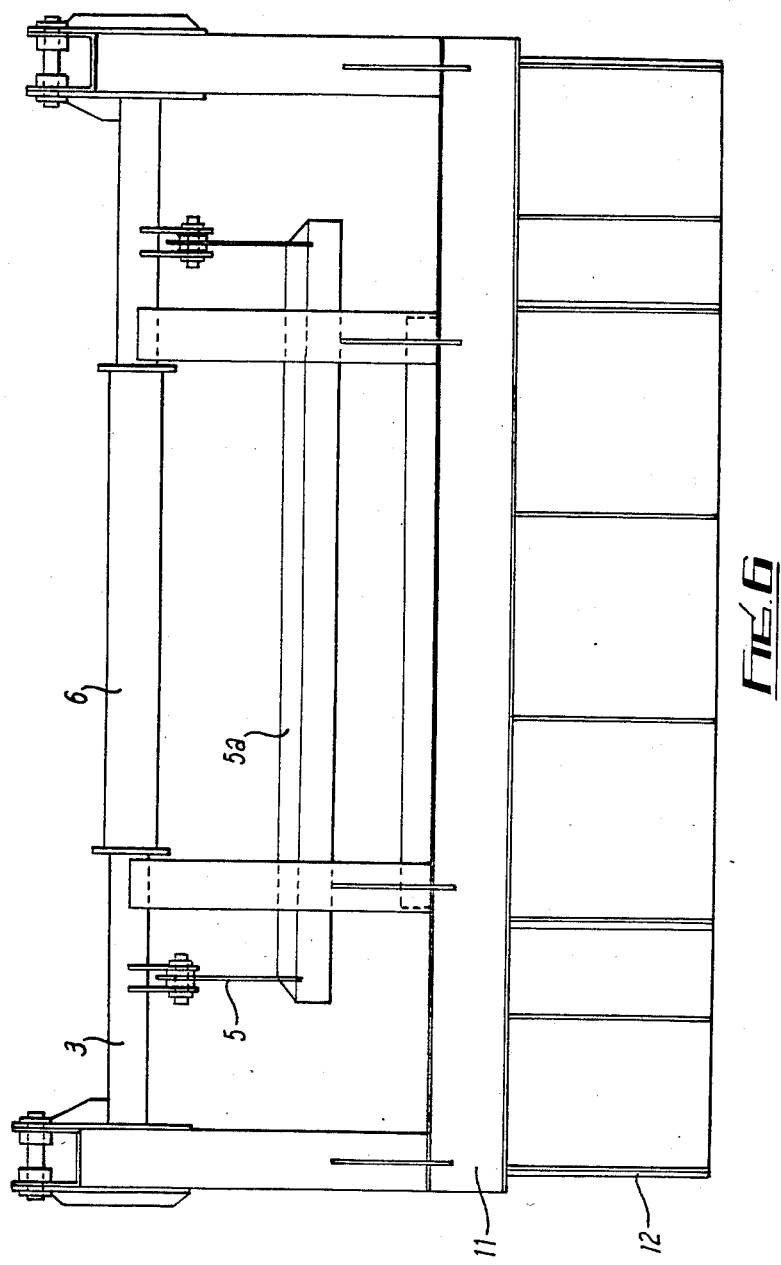
FIG. 6 is an end view of the anchor of FIG. 4.

An example of such an anchor is shown in FIGS. 4 to 6. In this anchor the main frame assembly 3 and locking gate 5 is fixed directly to a base member 11 which has ground engaging spikes 12 projecting from its lower surface. A ballast box 13 is also mounted on the base member 11 and is in use filled with weights.

The choice of a pile or gravity type anchors depends on a number of factors. These are, the tension in the guide wire during pipeline initiation; the seabed conditions; the lifting capacity of the laying vessel and the available space around the proposed location of the anchor.

The gravity type anchor is well suited to seabed conditions where reasonably good cohesion and passive resistance is found in the top layer of soil. For differing soil conditions the dead weight of the anchor and the length and design of the spikes can be adjusted accordingly in the anchor design.

When top layer soil conditions are not suitable for the gravity anchor a pile fixing can be used to gain the advantage of more cohesive soils at greater depth or to provide more penetration in the upper layers of soil than could be obtained by the spikes on a gravity anchor.

Figure 7:
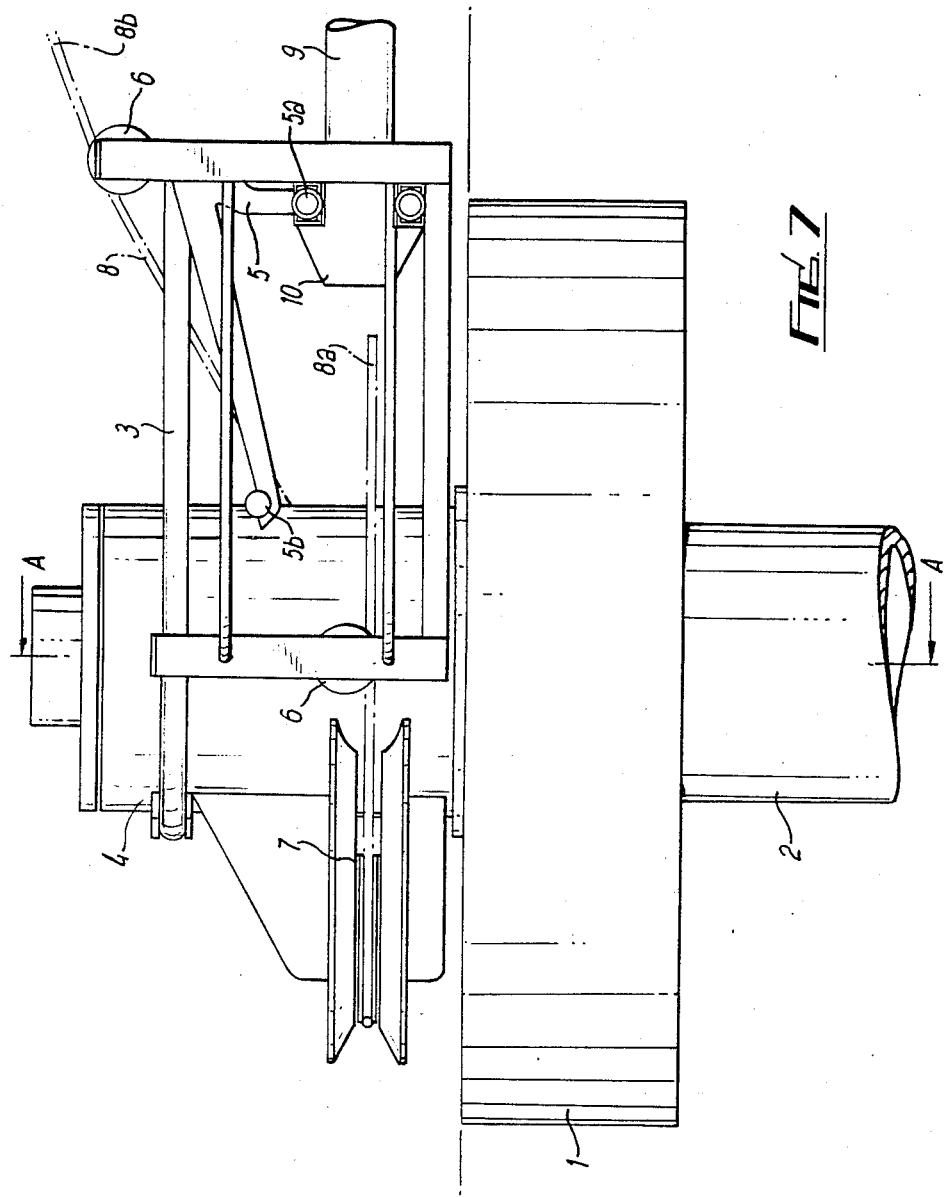
FIG. 7 is a side view of a third embodiment of a pipe initiation anchor in accordance with the present invention.
Figure 8:
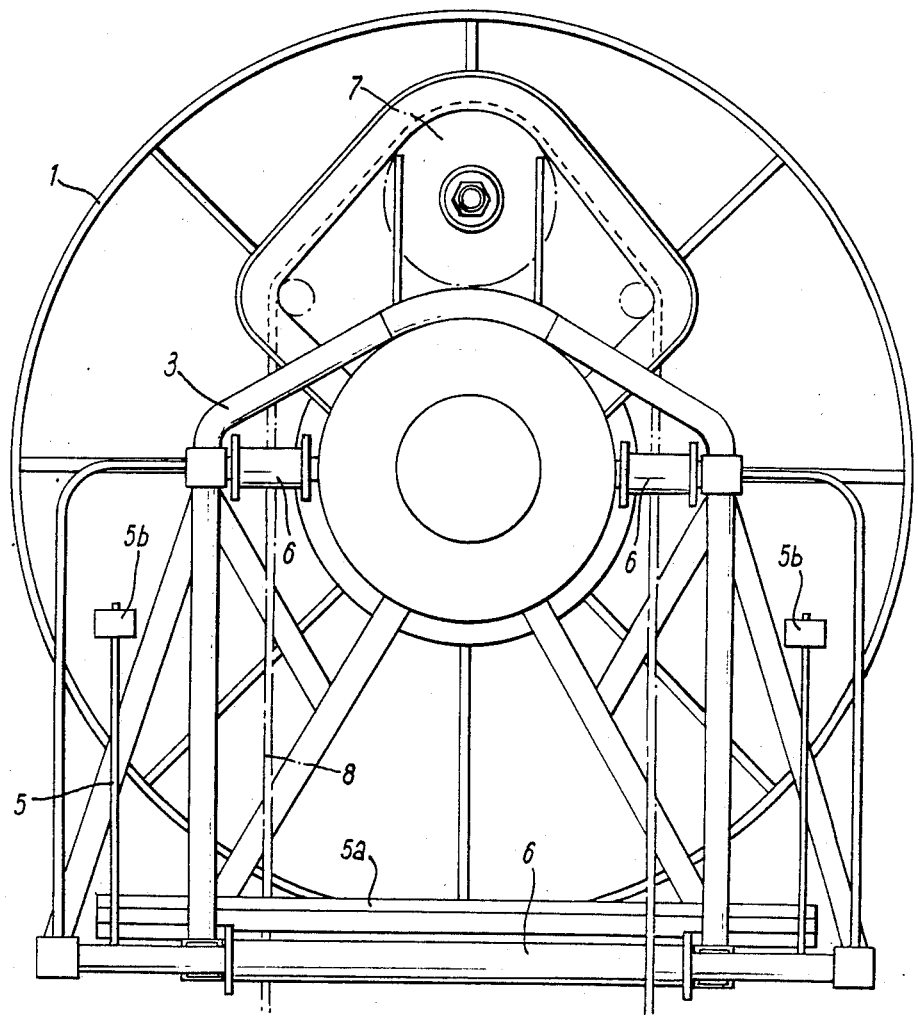
FIG. 8 is a plan view of the anchor of FIG. 7.
Figure 9:
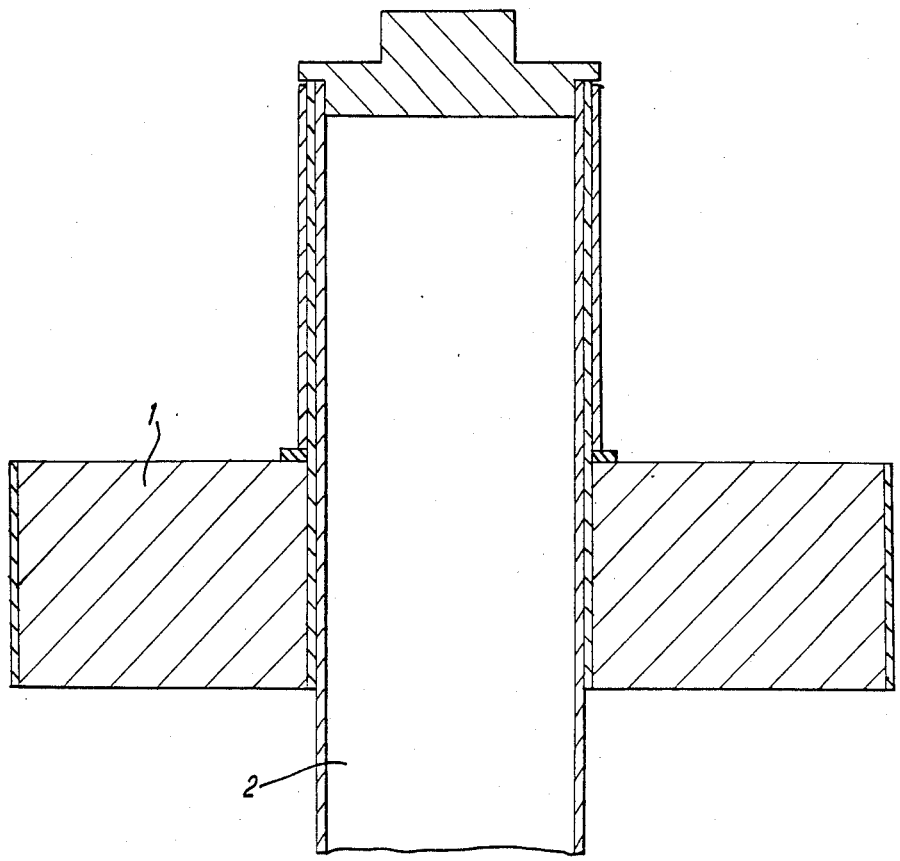
FIG. 9 is a sectional end view of the anchor of FIG. 7 taken along the line A—A.

A further embodiment of a pile type anchor is shown in FIGS. 7 to 9. This anchor is functionally identical to that shown in FIGS. 1 to 3, but has the advantages of a balanced lifting load and more compact dimensions as the locking gate 5 is closer to the centre line of the pile 2. In FIG. 7 the initiation head 10 and the pipeline 9 are shown in position in the locking gate 5.

There are a number of advantages of this type of anchor assembly.

The compact design of the anchor assembly allows it to be placed in close proximity to other subsea structures.

The swivel mounting of the main frame assembly and locking gate means that orientation of the anchor during placement is not important as the assembly can easily be rotated to the required direction.

Modifications and improvements may be made without departing from the scope of the invention.

I claim:

1. In a pipe initiation anchor for forming a fixed anchor point for use in laying underwater pipelines, the combination of:
   a frame;
   a ground engaging member;
   means for attaching said frame to said ground engaging member; and
   socket means carried in said frame defining a socket for receiving and retaining the end portion of the pipeline within said socket,
   said socket means including first and second generally horizontal bars, with said first bar mounted in said frame and with said second bar mounted on a pivoting member in said frame and spaced from said first bar, and
   a counter-balance weight carried on said pivoting member urging said second bar toward said first bar.

2. A pipe initiation anchor as defined in claim 1 including a wire arrangement carried in said frame including a sheave mounted in said frame for rotation about a vertical axis, whereby a wire passes around the sheave and exits from the anchor through an entrance to said socket, one end of the wire being attachable to a winch arrangement and the other end of the wire being attachable to the pipeline to allow the pipeline to be pulled into the socket.

3. A pipe initiation anchor as defined in claim 2 wherein said means for attaching said frame to said ground engaging member includes pivot means with said frame pivoting about a vertical axis, and
   wherein said wire arrangement includes a pulley positioned adjacent said socket and remote from said frame vertical axis whereby the wire passes from the entrance to said socket, about said sheave, and around said pulley to the winch arrangement.

4. A pipe initiation anchor as defined in any one of claim 1-3 wheren said ground engaging member is a gravity anchor comprising a ballast box with dead weights and having base spikes.

5. A pipe initiation anchor as defined in any one of claims 1-3 wherein said ground engaging member is a ground pile.

* * * * *